Dec. 20, 1932.　　　A. J. HILLS　　　1,891,818
STEERING GEAR
Filed May 27, 1932　　2 Sheets-Sheet 1
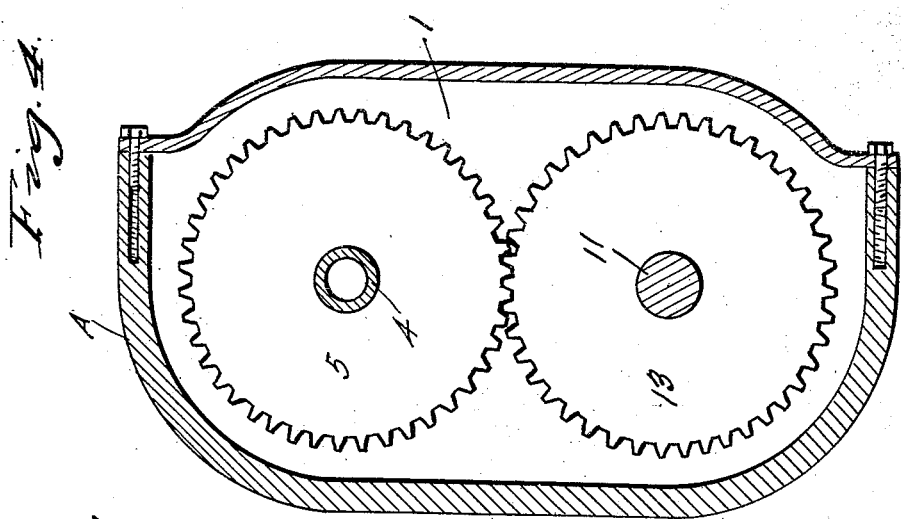
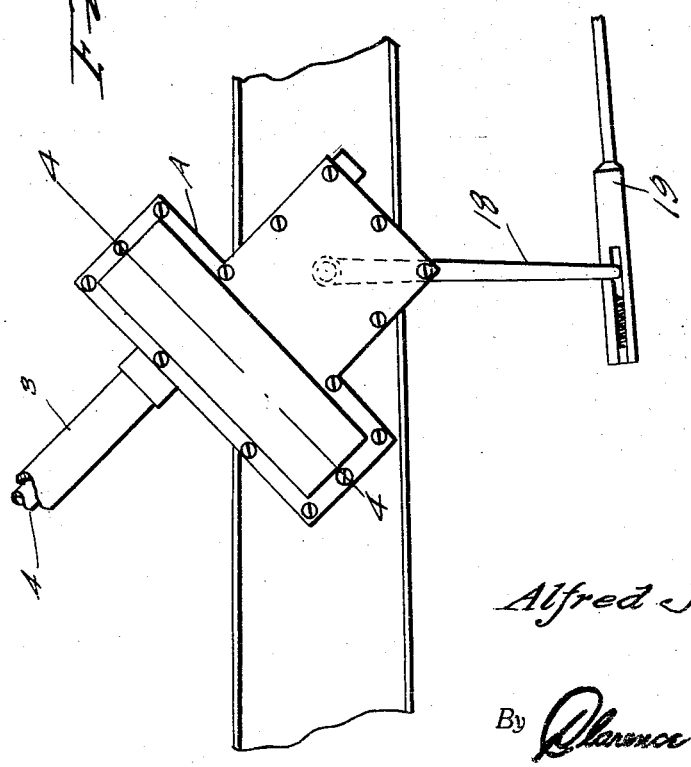
Inventor
Alfred J. Hills
By Clarence A. O'Brien
Attorney Dec. 20, 1932.  A. J. HILLS  1,891,818
STEERING GEAR
Filed May 27, 1932  2 Sheets-Sheet 2
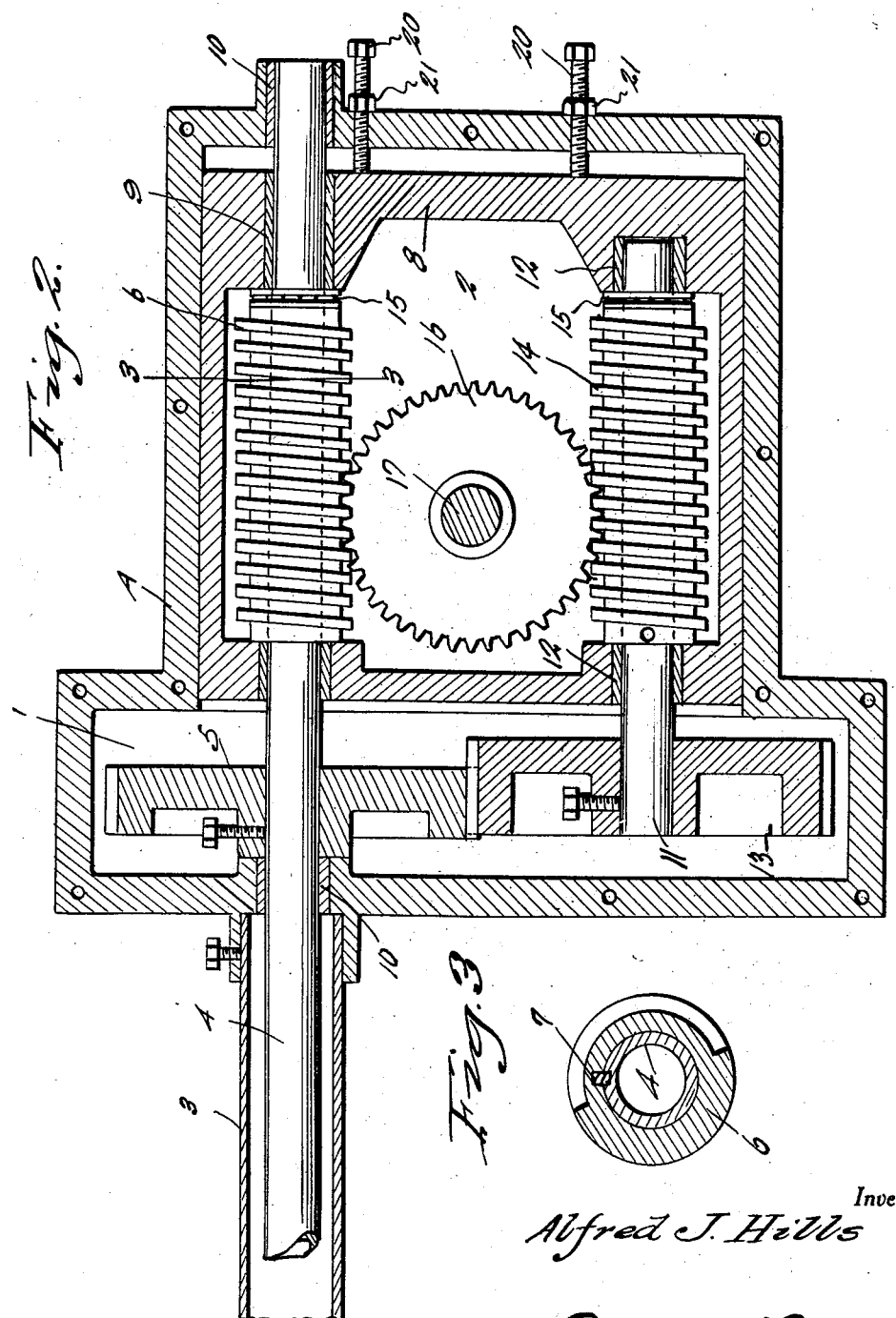
Inventor
Alfred J. Hills
By Clarence A. O'Brien
Attorney Patented Dec. 20, 1932

1,891,818

UNITED STATES PATENT OFFICE

ALFRED J. HILLS, OF ABILENE, KANSAS

STEERING GEAR

Application filed May 27, 1932. Serial No. 614,004.

This invention relates to improvements in steering gears for motor vehicles and the like, the general object of the invention being to provide a pair of worms, one of which is connected to the steering shaft, which are placed on opposite sides of the worm gear which impart movement of the shaft to the steering mechanism, whereby one worm acts when the shaft is turned in one direction and the other worm acts when the shaft is turned in the opposite direction, and to provide thrust bearings for the worms to take up the thrust of the worms as they are moving the worm gear.

Another object of the invention is to provide means whereby wear can be easily and quickly eliminated.

This invention also consists in certain other features of construction and in the combination and arrangement of the several parts to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:

Figure 1 is a side view of portions of a motor vehicle showing the invention in use.

Fig. 2 is a sectional view through the gearing.

Fig. 3 is a section on line 3—3 of Fig. 2.

Fig. 4 is a section on line 4—4 of Fig. 1.

In these drawings, the letter A indicates the gear housing which is formed with a top chamber 1 and a lower chamber 2. Part of the steering column is shown at 3 and a part of the steering shaft is shown at 4. This shaft extends into the housing and has attached thereto a gear 5 which is located in the chamber 1 and a worm 6 which is located in the chamber 2. This worm 6 is connected to the shaft by a key 7, as shown in Fig. 3, so that it has sliding movement on the shaft, but cannot rotate thereon.

A hollow member 8 is arranged in the chamber 2 and the shaft 4 passes through the same and this member carries the bearings 9 for the shaft, said shaft also having the bearings 10 therefor in the upper and lower parts of the housing A. A second shaft 11 is journalled in the member 8 as shown at 12, and extends into the chamber 1 and this part of the shaft 11 which extends into the chamber 1 has fastened thereto a gear 13 which meshes with the gear 5 and is of greater thickness than the gear 5.

This shaft 11 also carries a worm 14 which is fastened thereto, both the worms 6 and 14 being provided with left hand threads and thrust bearings 15 are provided for the lower end of each worm. These worms are arranged on opposite sides of the worm gear 16 carried by the shaft 17 passing transversely thru the chamber 2 and which has at its outer end an arm 18 which engages the shaft 19 of the steering mechanism.

The member 8 can be moved upwardly by means of the adjusting screws 20 passing through threaded holes in the bottom of the housing and provided with the lock nuts 21.

Thus it will be seen that as the steering wheel and shaft 4 are turned in one direction or the other, the worms 6 and 14 are turned clockwise and anti-clockwise so that one worm acts or works when the steering wheel is turned to the right and the other worm acts when the steering wheel is turned to the left and that with both worms, the thrust comes against the bearings 15.

It will also be seen that by pressing the member 8 upwardly by the set screws 20, wear on the thrust bearings and on the gearing will be taken up or eliminated. As shown, the worms engage the worm wheel nearest to their upper ends than their lower ends, so as to give additional length for adjusting purposes and the gear 13 is made of greater width than the gear 5. Thus when the member 8 is adjusted, the shaft 11 and the worm 14 and gear 13 move with the member 8 and by making the gear 13 of greater width it will remain in mesh fully with the gear 5.

One worm works with a thrust, either way the steering wheel is turned, and the other one just follows through, and then when the wheel is reversed in rotation the other worm takes the thrust and the second worm follows through. In other words, one worm turns the wheels of the car for a left turn and the other worm for a right turn.

It is thought from the foregoing description that the advantages and novel features of the invention will be readily apparent.

It is to be understood that changes may be made in the construction and in the combination and arrangement of the several parts provided that such changes fall within the scope of the appended claim.

Having thus described my invention, what I claim as new is:—

In combination with a steering shaft and a shaft extending at right angles therefrom and connected with the steering mechanism, a housing into which both shafts extend, a worm gear on the second-mentioned shaft, a stub shaft paralleling the steering shaft and located in the housing, a left hand worm on the steering shaft meshing with the worm gear at one side thereof, a left hand worm on the stub shaft meshing with the worm gear at the opposite side thereof, thrust bearings at the lower ends of said worms, gears connected with the stub shaft and the steering shaft and meshing with each other, an adjustable member in the housing with which the thrust bearings engage and which carries the stub shaft, the gear and the worm of the stub shaft being attached thereto and means for slidably connecting the worm of the steering shaft thereto, and means for adjusting the member to take up wear.

In testimony whereof I affix my signature.

ALFRED J. HILLS.